United States Patent [19]

Dehennau et al.

[11] Patent Number: 5,635,550
[45] Date of Patent: Jun. 3, 1997

[54] STARCH-BASED COMPOSITION

[75] Inventors: Claude Dehennau; Thierry Depireux, both of Waterloo, Belgium

[73] Assignee: Solvay (Société Anonyme), Brussels, Belgium

[21] Appl. No.: 288,507

[22] Filed: Aug. 10, 1994

Related U.S. Application Data

[63] Continuation-in-part of Ser. No. 227,230, Apr. 12, 1994, Pat. No. 5,510,401, which is a continuation of Ser. No. 14,679, Feb. 8, 1993, abandoned.

[30] Foreign Application Priority Data

Feb. 7, 1992 [BE] Belgium ............................... 09200130

[51] Int. Cl.$^6$ ............................................. C08L 3/00
[52] U.S. Cl. ................. 524/47; 523/124; 523/128; 524/312; 524/377; 525/54.2
[58] Field of Search ........................... 523/124, 128; 524/47, 312, 377; 525/54.2

[56] References Cited

U.S. PATENT DOCUMENTS

| | | | |
|---|---|---|---|
| 4,133,784 | 1/1979 | Otey et al. | 260/17.4 ST |
| 5,026,745 | 6/1991 | Weil | 524/47 |
| 5,334,634 | 8/1994 | Bastioli et al. | 524/47 |

FOREIGN PATENT DOCUMENTS

| | | |
|---|---|---|
| 0282451 | 9/1988 | European Pat. Off. . |
| 0304401 | 2/1989 | European Pat. Off. . |
| 0408503 | 1/1991 | European Pat. Off. . |
| 409788 | 1/1991 | European Pat. Off. . |
| WO90/1043 | 2/1990 | WIPO . |
| WO90/05161 | 5/1990 | WIPO . |
| WO90/10019 | 9/1990 | WIPO . |
| 90/10671 | 9/1990 | WIPO ............................ 524/47 |
| WO91/02025 | 2/1991 | WIPO . |

OTHER PUBLICATIONS

Ind. Eng. Chem., Prod. Res. Develop., vol. 13, No. 1, 1974, "Starch–Based Film for Degradable Agricultural Mulch", Otey et al., pp. 90–91.

"Viscoelastic Properties Of Polymers", John D. Ferry, 3rd Edition, pp. 11 to 15.

Journal of Applied Polymer Science, vol. 40, pp. 811–812 "Composites of Starch and Poly(ethylene–co–acrylic acid) Complexing between Polymeric Components", Fanta et al.

Lin, Chen–Chong et al., "Studies on multicomponent polymers, VI. PE/starch/calcium carbonate polyblends." Chemical Abstracts, vol. 92, No. 10, Abstract No. 77309g, p. 27 (Mar. 10, 1980).

*Primary Examiner*—Edward J. Cain
*Attorney, Agent, or Firm*—Spencer & Frank

[57] ABSTRACT

The invention relates to an alloy composition possessing improved properties of mechanical resistance. The composition contains a starch, which is preferably plasticized, and a polymer which acts as coupling agent which is chosen from the group consisting of polyolefins modified by chemical functional groups which are active toward the hydroxyl functional groups of starch. Generally, the composition also contains a thermoplastic polymer. The invention also relates to the process for preparing this composition and the use of these compositions for the manufacture of films intended for the paper market and for packages made from biodegradable plastic.

17 Claims, No Drawings

STARCH-BASED COMPOSITION

CROSS-REFERENCE TO RELATED APPLICATIONS

This application is a continuation-in-part of our application Ser. No. 08/227,230 filed Apr. 12, 1994 U.S. Pat. No. 5,510,401, which is a continuation of application Ser. No. 08/014,679 filed Feb. 8, 1993, and now abandoned, and is related to Belgian application No. 092 00130 filed Feb. 7, 1992 now Belgian Patent No. 1,005,694 granted Dec. 21, 1993, each of which is incorporated herein by reference.

FIELD OF THE INVENTION

The present invention relates to a composition based on optionally plasticised starch possessing improved properties, especially improved transparency and mechanical resistance, by virtue of the presence of a coupling agent optionally comprising a thermoplastic polymer.

The invention also relates to the process for preparing the composition according to the invention and to its use.

TECHNOLOGY REVIEW

Starch constitutes an important source of macromolecules since it is renewable by means of the photosynthesis cycle, an it is available in large amounts, is biodegradable and is inexpensive.

Owing to its chemical and physical structure, starch is not intrinsically a thermoplastic and it is mainly used in water-based preparations as a binder, thickener or foodstuff.

Attempts have therefore been made to modify starch by plastifying it and/or by subjecting it to an appropriate heat treatment so as to render it workable at high temperature.

The use of a starch which is structurally modified during a preliminary processing such as an extrusion and, optionally, the addition of water, which renders the final product mouldable at high temperature, has been proposed in European Patent Application EP-A-0 304 401 (Warner Lambert Co.).

Additional components such as plasticisers comprising polyalkylene glycol or glycerol acetate can also be incorporated into structurally modified starch.

The use of another structurally modified starch, whose viscosity has been reduced by means of a depolymerisation catalyst, is proposed in European Patent Application EP-A-0 282 451 (Warner Lambert Co.).

Additional components such as plasticisers, diluents or fillers can also be incorporated into starch.

The extrusion of thermoplastic starch in the form of a mixture of a starch, which is at least partially crystalline, with water and/or other additives such as glycerine (5 to 35% by weight relative to the total weight of the mixture), which reduce its melting point (see page 27, lines 1 to 7 and claim 13), is known from the document WO-90 10 019 (Tomka).

A technique for heating and mixing starch with other additives which permit melting of the starch at a temperature lower than its decomposition temperature, is known from Patent Application WO-90 05 161 (Tomka).

However, starch which is treated by these processes remains a hydrophilic material which absorbs water, which plasticises it and causes it to loose all mechanical properties. This constitutes a major obstacle to a mass use of this product, although the hydrophilic character also constitutes a property which is essential for good biodegradability.

Research studies have therefore also been carried out in order to reduce the sensitivity of starch to water, especially by coating the starch with a hydrophobic compound.

European Patent Application EP-O 378 646-A (Tomka) (equivalent to WO-90 00 1043) describes the coating of a hydrophilic polymer such as starch or gelatine with a film-forming hydrophobic compound consisting of polyhydroxycarboxylic acid, optionally supplemented with proteins, natural lipids, wax and/or paraffin.

The document "Starch-based film for Degradable Agricultural Mulch" (Ind. Eng. Chem. Prod. Res. Develop. vol. 13 (1), 1974, p. 90) describes a coating with polyvinyl chloride (PVC) or with a vinylidene chloride and acrylonitrile copolymer, of a film of starch supplemented with polyvinyl alcohol (PVA) and cross-linked with formaldehyde.

Mixtures of starch with copolymers have also been described in the following documents:

- U.S. Pat. No. 4,133,784 (U.S. Secretary of Agriculture) and the document "Composites of starch and polyethylene coacrylic acid, complexing between polymer components", (Journal of Applied Polymeric Science, vol. 40, pp. 811 to 821, 1990) mention a composite material based on starch and an ethylene and acrylic acid (EAA) copolymer which is described as being stable under atmospheric conditions only for limited periods of time.
- Patent EP-O 408 503-A (Warner Lambert Co.) describes a composite material consisting of structurally modified starch and ethylene-vinyl alcohol type (EVOH) copolymers and optionally a thermoplastic polymer which is insoluble in water.

However, the products obtained are found to be fragile and tear easily directly after their processing, and during storage they soften with the adsorption of water and the plasticisation which it produces.

SUMMARY OF THE INVENTION

The invention provides a composition based on a starch modified by the addition of a so-called polymer coupling agent which confers on the thermoformed starch improved properties, in particular improved properties of transparency, tear strength and reduced bleaching during folding.

Additionally, the present invention provides an agent which acts as compatibility-promoting agent for a mixture of starch with a thermoplastic polymer and which enhances the mechanical resistance properties of the said mixture.

DETAILED DESCRIPTION OF THE INVENTION

The addition to starch of polymers such as polyolefins which reduce the penetration of water by their natural hydrophobicity, can be envisaged so that these mixtures possess improved properties of resistance to moisture. Mixtures of this type, in particular mixtures of polyolefin and starch are however very heterogeneous since very polar starch is incompatible with an apolar polyolefin.

According to the invention, an alloy composition is proposed which possesses improved properties of transparency and mechanical resistance, comprising a starch and a polymer acting as coupling agent which is chosen from the group consisting of polyolefins modified by chemical functional groups which are active towards the hydroxyl functional groups of starch, which is characterised in that the ratio of its dynamic modulus of elasticity G' to its dissipative modulus G", measured at 160° C. and at a frequency of either 0.1 rad per s ($0.1\ s^{-1}$) or 100 rad per second ($100\ s^{-1}$), is greater than 1.6, and preferably greater than 1.7.

Details on the measurement and the physical significance of the G' and G" moduli are given in a description below of the preferred embodiments of the invention.

According to the preferred embodiment of the invention, the polymer which acts as coupling agent is chosen from the group consisting of polyolefins modified by grafting maleic anhydride, and of ethylene copolymers and terpolymers containing units derived from maleic anhydride.

The use of starch supplemented with a plasticiser, in particular glycerine, diglycerine, polyglycerine and/or sorbitol, can prove to be advantageous in many cases.

According to another preferred embodiment of the invention, the composition also comprises a thermoplastic polymer which is preferably a polyolefin such as polyethylene.

The starches used are of natural and plant origin. These carbohydrates are mainly composed of amylose and/or amylopectin which occur in variable amounts depending on their biological origin. They may be structurally modified, pregelatinised or modified after the addition of water and/or a plasticiser as described above according to the process described in Patent Application WO-90 10 019 (Tomka).

By way of non-limitative example, the starch may be a normal maize starch, a maize starch high in amylose (EURYLON 7® from Roquette), a maize starch high in amylopectin (Waxilys® from Roquette), a wheat starch (Nutralys® from Roquette), a potato starch or a mixture thereof.

Preferably, the starch used in the compositions of the invention is a starch whose amylopectin content is greater than 70%, which makes it possible to obtain products which are more transparent, colourless and non-sticky after retaining water on contact with atmospheric moisture.

The percentages by weight of the various components of the alloy according to the invention are respectively of the order of 20 to 80%, and preferably 40 to 60% of starch, preferably plasticised starch, 0 to 70%, and preferably 30 to 50% of thermoplastic polymer, and 1 to 30%, preferably 5 to 20% of coupling agent.

When plasticised starch is used, it may contain up to 50% by weight of plasticiser, preferably, however, of the order of 5 to 40% by weight of plasticiser, expressed relative to the total weight of the starch and the plasticiser.

The polymers serving as the coupling agents used in the compositions according to the invention are, as already indicated, compounds which possess chemical functional group which are active towards the hydroxyl functional groups of the starch.

These polymers are not very crystalline and have a melting point of less than 150° C.

Advantageously, the coupling agent can also be used to make a thermoplastic polymer starch-compatible.

The addition of a thermoplastic polymer, in particular a polyolefin such as polyethylene which reduces the penetration of water by virtue of its natural hydrophobicity, gives an alloy which possesses improved moisture resistance properties.

In the compositions containing 20 to 80%, preferably 40 to 60% of plasticised starch, the incorporation of 10 to 70%, preferably 30 to 50% of a thermoplastic polymer, and 1 to 30%, preferably 5 to 20% of a compatibility-promoting agent, also makes it possible to increase the breaking elongation properties, at various temperatures, of the products of the invention.

Another aspect of the invention relates to a process for preparing a starch-based composition in which a plasticisation means is supplied with a mechanical mixture containing the coupling agent, the starch supplemented with a plasticiser which may be precompounded, and optionally a thermoplastic polymer. The plasticisation means may be a co-rotating twin screw extruder equipped with one or more degassing vents or an inner mixer which melts the mixture. The starch may be either dried or not before being incorporated into the mixture, and it may be in a form of a powder impregnated with plasticiser or in the form of granules which are plasticised during a preliminary compounding operation.

DESCRIPTION OF THE PREFERRED EMBODIMENTS OF THE INVENTION

The products entering into the compositions of the invention are melted and homogenised with a co-rotating twin screw extruder or a laboratory Brabender® plastograph inner mixer according to the conditions described in the examples below.

Rheological measurements are then carried out in a 1 mm thick plate obtained by hot pressing the mixtures thus produced and drying at 70° C. under vacuum for 12 hours.

The rheological measurements show that the formulations which are most resistant to tearing, which are the least bleached during folding and which are most transparent, are those which have a ratio of their dynamic modulus G', representative of their elastic response (shear storage modulus), to their dissipative modulus G" (shear loss modulus), measured at a temperature of 160° C. and a frequency of either 0.1 rad per second ($0.1\ s^{-1}$) or 100 rad per second ($100\ s^{-1}$), greater than 1.6 and preferably greater than 1.7, and that the choice of maleic anhydride-containing copolymer or terpolymer is advantageous.

The physical significance of the G' and G" moduli, the expressions inking them and other details relating to them have been described in the document "Viscoelastic properties of polymers" by J. D. Ferry, 2nd edition, John Wiley & Sons, Inc. 1970 (pages 12 to 15).

The G' and G" moduli are evaluated at 160° C. using a rheometer which makes it possible to measure the dynamic mechanical properties of the polymers from the glassy or crystalline state to the molten state. The measurements in the molten state are carried out on tablets 1 to 2 mm thick and 2.5 cm in diameter taken from plates which are pressed from the compositions according to the invention.

The measurement in examples 1 to 14 below consists in determining, at a frequency of 0.1 rad per second ($0.1\ s^{-1}$), at a temperature of 160° C., the G' and G" moduli on the various alloy compositions of the invention, on a common base formula containing 75% by weight of starch+plasticiser and 25% by weight of compatibility-promoting agent.

The examples below illustrate the invention.

EXAMPLE 1

(reference)

38.9 g of starch is mixed with 13.6 g of glycerine and 17.5 g of Dowlex® low density linear polyethylene type 4000E. This mixture is introduced into a laboratory Brabender® plastograph inner mixer heated to a constant temperature of 160° C. and then mixed for 10 minutes at a cam rotating speed of 50 revolutions/minute. After the mixing, the molten mass is collected. After it has cooled, a portion of it is collected and pressed in a press, either with a thickness of 0.35 mm in order to evaluate the transparency, the homogeneity and the tear strength on the one hand, or with a thickness of 1 mm in order to evaluate the G' and G" moduli by means of a Rheometrics® rheometer and at a temperature of 160° C. At 0.1 s$^{-1}$, the G'/G" ratio is 1.15. The film obtained is found to be heterogeneous and to tear easily.

EXAMPLE 2

(reference)

The procedure is the same as in Example 1 except that LLDPE is replaced by an ethylene/acrylic and methacrylic acid copolymer containing 26% of Escor® acrylic and methacrylic acid type ATX 325. The G'/G" ratio is equal to 1.34 and the films obtained tear easily.

EXAMPLE 3

(reference)

The procedure is the same as in Example 1 except that LLDPE is replaced with a Lotryl® ethylene/acrylic ester copolymer type 3400. The G'/G" ratio is equal to 1.27 and the films are heterogeneous and fragile.

EXAMPLE 4

(reference)

The procedure is the same as in Example 1 except that LLDPE is replaced with Admer® maleic anhydride-grafted polyethylene type L2100. The G'/G" ratio is equal to 1.67 and the films obtained are homogeneous, resistant to tearing but become bleached at the position of a fold.

EXAMPLE 5

(reference)

The procedure is the same as in Example 1 except that LLDPE is replaced with a Lotader® ethylene/acrylic ester/ maleic anhydride copolymer type 3700. The G'/G" ratio is 1.47; the films tear and are heterogeneous.

EXAMPLE 6

(reference)

The procedure is the same as in Example 1 except that a type 3410 Lotader® is used. The G'/G" ratio is 1.71 and the films are homogeneous, are difficult to tear and do not bleach at the position of a fold.

EXAMPLE 7

(reference)

The procedure is the same as in Example 1 except that a type 3200 Lotader® is used. The G'/G" ratio is 2.11 and the films are homogeneous, resistant to tearing and do not bleach at the position of a fold.

EXAMPLE 8

(reference)

The procedure is the same as in Example 1 except that a Rexpearl® ethylene/glycidyl methacrylate copolymer type RA3150 is used. The G'/G" ratio is 1.45 and the films obtained tear and are heterogeneous.

EXAMPLE 9

(reference)

The procedure is the same as in Example 1 except that a Rexpearl® ethylene/glycidyl methacrylate/acrylic ester copolymer type JS4450 is used. The G'/G" ratio is 1.38 and the films tear and are heterogeneous.

EXAMPLE 10

(reference)

The compound obtained in Example 7 is granulated. 42 g of these granules are mixed with 28 g of Dowlex® linear low density polyethylene type 4000E. The mixture is subjected to the same procedure as that described in Example 1. The films obtained are homogeneous, do not tear and do not become bleached at the position of a fold.

EXAMPLE 11

(reference)

The compound obtained in Example 6 is granulated. 42 g of these granules are mixed with 28 g of Dowlex® linear low density polyethylene type 4000E. The films obtained are homogeneous, do not tear and do not become bleached at the position of a fold. The percentage of breaking elongation measured, after the water regain has stabilised, at 23° C., with an IVSTRON apparatus (speed 100 mm/minute), is 90%, and at 190° C., with a Rheometrics® elongational viscosimeter (speed gradient=0.5 s$^{-1}$) is 1420%.

EXAMPLE 12

(reference)

The same test as that of Example 11 is carried out except that the compound prepared in Example 1 is used as starting material. The films obtained tear and are heterogeneous. The percentage of breaking elongation, measured under the same conditions as that for Example 11, is 41% at 23° C. and 346% at 190° C.

EXAMPLE 13

(reference)

34.125 g of Roquette® normal, native and non-dried maize starch (12.5% by weight of water) are mixed with 18.375 g of glycerine and with 17.5 g of Lotader® 3200. The mixture is mixed and processed according to the procedure used in Example 1. The G'/G" ratio is 1.95 and the quality of the films obtained is equivalent to that observed during examination of the films of Example 7.

EXAMPLE 14

(reference)

22.75 g of Roquette® normal, native and non-dried maize starch (12.5% by weight of water) are mixed with 12.25 g of glycerine, 28 g of Dowlex® 4000E and 7 g of Lotader® 3200. The whole is mixed and processed according to the procedure used in Example 1. The quality of the films is equivalent to that of the films of Example 10.

The products obtained can be used for the manufacture of films intended for the paper market or for packages made from biodegradable plastic.

In examples 15 to 24 below, the measurement consists in determining, at a frequency of 100 rad per second (100 s$^{-1}$), at a temperature of 160° C., the G' and G" moduli on the various alloy compositions of the invention, on a common base formula containing 75% by weight of starch+plasticiser and 25% by weight of compatibility-promoting agent.

The examples below illustrate the invention.

EXAMPLE 15

(reference)

38.9 g of starch is mixed with 13.6 g of glycerine and 17.5 g of Dowlex® low density linear polyethylene type 4000E. This mixture is introduced into a laboratory Brabender® plastograph inner mixer heated to a constant temperature of 160° C. and then mixed for 10 minutes at a cam rotating speed of 50 revolutions/minute. After the mixing, the molten mass is collected. After it has cooled, a portion of it is collected and pressed in a press, either with a thickness of 0.35 mm in order to evaluate the transparency, the homogeneity and the tear strength on the one hand, or with a thickness of 1 mm in order to evaluate the G' and G" moduli by means of a Rheometrics® rheometer and at a temperature of 160° C. The G'/G" ratio is 1.15. The film obtained is found to be heterogeneous and to tear easily.

EXAMPLE 16

(reference)

The procedure is the same as in Example 15 except that LLDPE is replaced by an ethylene/acrylic and methacrylic acid copolymer containing 26% of Escor® acrylic and methacrylic acid type ATX 325. The G'/G" ratio is equal to 1.34 and the films obtained tear easily.

EXAMPLE 17

(reference)

The procedure is the same as in Example 15 except that LLDPE is replaced with a Lotryl® ethylene/acrylic ester copolymer type 3400. The G'/G" ratio is equal to 1.27 and the films are heterogeneous and fragile.

EXAMPLE 18

The procedure is the same as in Example 15 except that LLDPE is replaced with Admer® maleic anhydride-grafted polyethylene type L2100. The G'/G" ratio is equal to 1.67 and the films obtained are homogeneous, resistant to tearing but become bleached at the position of a fold.

EXAMPLE 19

(reference)

The procedure is the same as in Example 15 except that LLDPE is replaced with a Lotader® ethylene/acrylic ester/maleic anhydride copolymer type 3700. The G'/G" ratio is 1.47; the films tear and are heterogeneous.

EXAMPLE 20

The procedure is the same as in Example 15 except that a type 3410 Lotader® is used. The G'/G" ratio is 1.71 and the films are homogeneous, are difficult to tear and do not bleach at the position of a fold.

EXAMPLE 21

The procedure is the same as in Example 15 except that a type 3200 Lotader® is used. The G'/G" ratio is 2.11 and the films are homogeneous, resistant to tearing and do not bleach at the position of a fold.

EXAMPLE 22

(reference)

The procedure is the same as in Example 15 except that a Rexpearl® ethylene/glycidyl methacrylate copolymer type RA3150 is used. The G'/G" ratio is 1.45 and the films obtained tear and are heterogeneous.

EXAMPLE 23

(reference)

The procedure is the same as in Example 15 except that a Rexpearl® ethylene/glycidyl methacrylate/acrylic ester copolymer type JS4450 is used. The G'/G" ratio is 1.38 and the films tear and are heterogeneous.

EXAMPLE 24

34.125 g of Roquette® normal, native and non-dried maize starch (12.5% by weight of water) are mixed with 18.375 g of glycerine and with 17.5 g of Lotader® 3200. The mixture is mixed and processed according to the procedure used in Example 1. The G'/G" ratio is 1.95 and the quality of the films obtained is equivalent to that observed during examination of the films of Example 21.

EXAMPLE 25

(reference)

The procedure is the same as in Example 15 except that LLDPE is replaced by Rexpearl® ethylene/glycidyl methacrylate copolymer type RA 4100 is used. The G'/G" ratio is 1.37 and the films obtained tear and are heterogeneous.

EXAMPLE 26

(reference)

The procedure is the same as in Example 15 except that LLDPE is replaced by an ethylene/acrylic acid copolymer type 435. The G'/G" ratio is equal to 1.49 and the films obtained tear easily.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A composition comprising a starch and a coupling agent which is a polymer chosen from the group consisting of polyethylene modified by grafting maleic anhydride, and ethylene terpolymers containing units derived from maleic anhydride, the ratio of the dynamic modulus of elasticity G' to its dissipative modulus G" of said composition measured at 160° C. and a frequency of 100 rad per second, being greater than 1.6.

2. The composition according to claim 1, wherein the G'/G" ratio is greater than 1.7.

3. The composition according to claim 1 wherein the starch is plasticised with a plasticiser selected from the group consisting of glycerine, diglycerine, polyglycerine, sorbitol, a polyol, and mixtures thereof.

4. The composition according to claim 1, wherein the starch used is destructurized or pregelatinised.

5. The composition according to claim 1, wherein the starch contains more than 70% by weight of amylopectin.

6. The composition according to claim 1, wherein the composition comprises from about:

20 to 80% by weight of plasticised starch, said starch plasticised with a plasticiser selected from the group consisting of glycerine, diglycerine, polyglycerine, sorbitol, a polyol, and mixtures thereof, 0 to 70% by weight of polyethylene, and 1 to 70% by weight of coupling agent.

7. The composition according to claim 4, wherein the starch used contains up to 50% by weight of plasticiser, expressed relative to the total weight of the starch and the plasticiser.

8. A process for preparing a composition comprising starch and a coupling agent which is a polymer chosen from the group consisting of polyethylene modified by grafting maleic anhydride, and ethylene terpolymers containing units derived from maleic anhydride, said process comprising a step for plasticising a composition comprising said coupling agent and starch until the ratio of the dynamic modulus of elasticity G' of said composition to the dissipative modulus G" of said composition, measured at 160° C. and at a frequency of 100 rad per s (G'/G"), is greater than 1.6, and recovering said plasticised composition.

9. The process according to claim 8, wherein said composition to be platicised is plasticised with an inner mixer.

10. The process according to claim 8, wherein said composition to be plasticised is plasticised with a co-rotating twin screw extruder.

11. The process according to claim 8, wherein said composition to be plasticised comprises a plasticised starch compound and a coupling agent.

12. The process according to claim 8, wherein said composition to be plasticised comprises a native, pregelatinised or destructurized starch, a plasticiser and a coupling agent.

13. A biodegradable film comprising a composition according to claim 1.

14. A process for preparing a biodegradable film according to claim 13.

15. The composition according to claim 1, including a thermoplastic polymer.

16. The composition according to claim 15, wherein said thermoplastic polymer is a polyolefin.

17. The composition according to claim 16, wherein said polyolefin is polyethylene.

* * * * *